(No Model.)
E. BERGIN.
CYLINDER DRAIN VALVE.
No. 502,602. Patented Aug. 1, 1893.
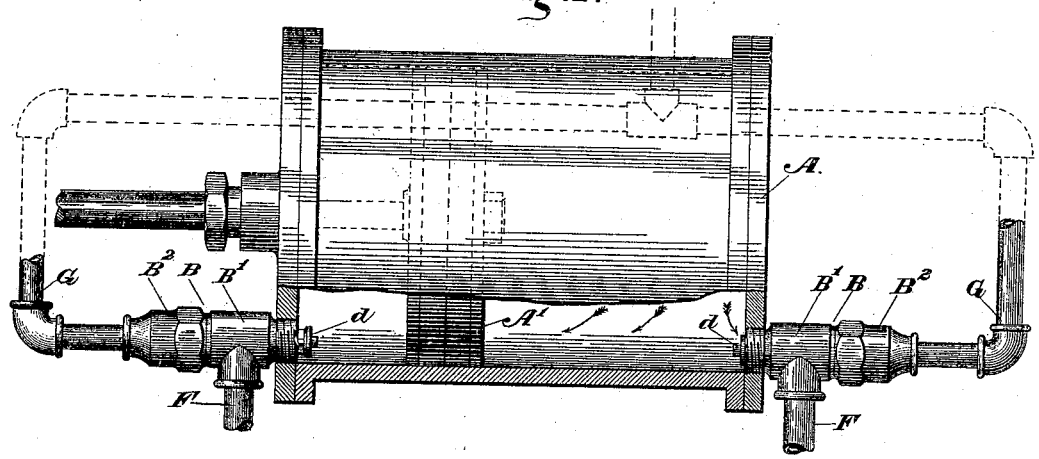
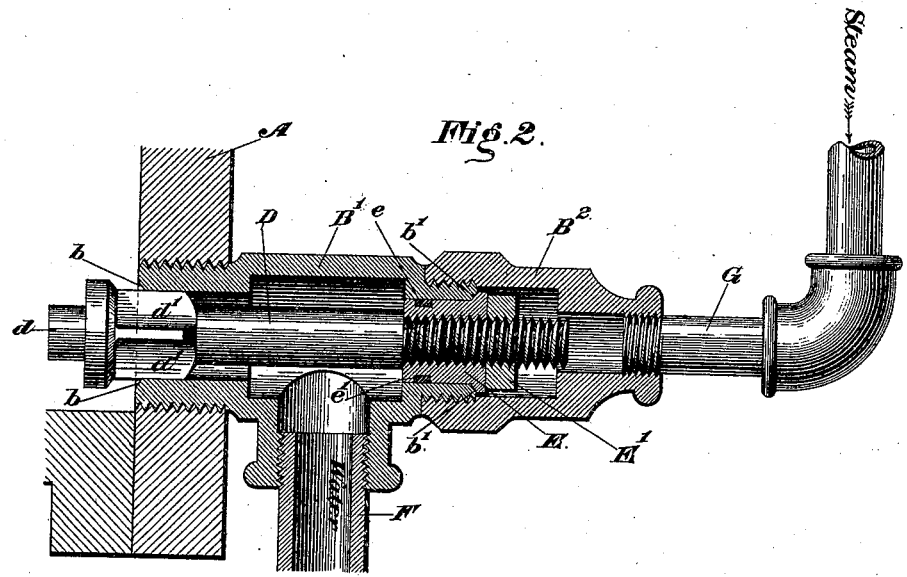
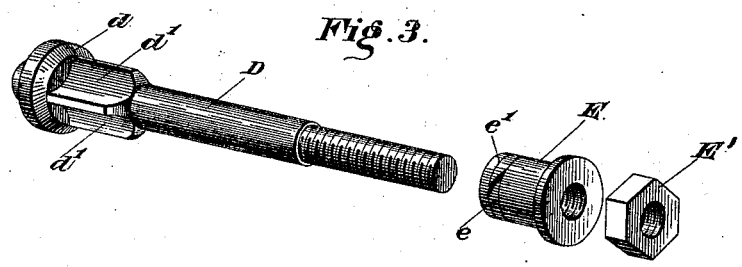
Witnesses:
M. E. Fowler
James R. Mansfield
Inventor:
Edward Bergin
By his Attorneys: Alexander & Dowell

UNITED STATES PATENT OFFICE.

EDWARD BERGIN, OF DAVENPORT, IOWA.

CYLINDER DRAIN-VALVE.

SPECIFICATION forming part of Letters Patent No. 502,602, dated August 1, 1893.

Application filed March 30, 1893. Serial No. 468,378. (No model.)

*To all whom it may concern:*

Be it known that I, EDWARD BERGIN, of Davenport, in the county of Scott and State of Iowa, have invented certain new and useful Improvements in Cylinder Drain-Valves; and I do hereby declare that the following is a full, clear, and exact description thereof, reference being had to the accompanying drawings, and to the letters of reference marked thereon, which form part of this specification.

This invention is an improved automatic cylinder drain cock for steam engines, its object being to provide an automatic steam-actuated drain valve whereby the water of condensation in the cylinder may be permitted to escape therefrom. I dispense with actuating springs, and utilize the live steam to unseat the drain valve, and the steam pressure in the cylinder to close the valves, alternately, and when steam is cut off from the cylinder, both drain valves will be opened so that the water of condensation on both sides of the piston can immediately escape.

The invention therefore consists in the novel combination and construction of parts hereinafter described and claimed.

In the drawings Figure 1 is a side view of a cylinder equipped with my improved drain valves. Fig. 2 is a longitudinal sectional view of the valve enlarged showing the escape of water of condensation from the cylinder. Fig. 3 is a detail.

In the drawings A designates a cylinder of ordinary construction and A' the piston therein.

B, B, designate the drain valve casings each consisting of two parts. The larger part B' is T-shaped and its horizontal portion is screw threaded at both ends, and provided with annular valve seats $b$, $b'$ as shown, made by slightly flaring the ends of bore. Seat $b'$ is smaller than seat $b$. The T part is also interiorly threaded so that a drain pipe F may be connected thereto. The other part $B^2$ of the casing is a tubular cap having its larger end interiorly threaded to engage the threaded end of the part B' and inclose seat $b'$ and the valve therefor as shown in Fig. 2. To the smaller end of part $B^2$ is connected a small live-steam pipe G which is directly or indirectly in communication with the steam space of the boiler so that a constant steam pressure is exerted upon the valve in part $B^2$.

Within the casing lies a valve stem D which extends entirely through part B' and has a valve $d$ on one end adapted to engage seat $b$. The part of the stem adjoining the valve $d$ is enlarged and longitudinally grooved as at $d'$ so as to permit the passage of water, &c., when the valve is opened while the stem is kept in proper axial position within part B'. The other end of stem D is screw threaded and on it is screwed a valve E adapted to fit on seat $b'$. This valve is so adjusted on the stem that when it is closed against the seat valve $d$ is unseated or opened and when valve $d$ is closed upon its seat, valve E is opened. The valve E can be locked when adjusted by means of a jam nut E' on the stem as shown. The body of valve E fits neatly in the cylindrical bore of part B', and is also annularly channeled as at $e'$ to receive a packing $e$ of suitable construction so that a steam tight joint may be maintained between valve E and part B' at all times and leakage of live steam be prevented. The larger end of the casing (in which is valve $d$) is screwed into the head of the cylinder as indicated in Figs. 1 and 2, one drain valve being screwed into each head of the cylinder at the lowest point thereof, so that water in the cylinder can escape through casing B' when valve $d$ is unseated. The pipes F may connect to a common waste pipe or other receptacle for waste water, and the pipes G may connect to a common live steam supply pipe as desired.

The operation of the invention is as follows:—When no steam is in the cylinder, the live steam pressure against valve E closes it, and in so doing causes the unseating of valves $d$ at both ends of the cylinder. When steam is admitted into the cylinder however, the pressure of steam therein against the valve $d$ opposite the end of piston against which the steam acts, causes it to close against the steam pressure on the related valve E because of the greater diameter of valve $d$, and keeps it closed until the piston has reached the end of its stroke and the main engine valves are shifted so as to admit live steam at the opposite end of the cylinder and allow the expanded steam to escape. As the steam escapes from the cylinder the pressure lessens on valve $d$ until it is overcome by the pressure on valve E, and valve $d$ opens. In short the valve $d$ at the "working end" of cylinder will be closed while that at the "idle" end will be opened, and as the ends of cylinder alternately become the "working" and "idle" end, the drain valves therein will be automatically alternately closed and opened. Thus any water of condensation in the "idle" end of cylinder will be discharged and the cylinder kept free from water. When steam is cut off from the cylinder, both valves $d$ will be automatically opened, so that water of condensation can escape at both ends of cylinder, simultaneously.

It will be obvious that the drain can be applied to a single acting as well as to a double acting engine, for each drain is independent of the other, and is positive, because it like the engine depends for its working upon the pressure of steam in the boiler, and will act uniformly as the greater the pressure of steam as it is admitted into the cylinder, the greater will be the pressure of steam against the valves E, so that uniform opening and closing of the drain valve are insured no matter what the variations in the steam pressure in the boiler may be. Whereas with spring-seated valves, a uniform action of the drain valve with varying steam pressures is about impossible to attain; and the springs need constant attention.

Having described my invention, what I claim as new, and desire to secure by Letters Patent thereon, is—

1. The combination with the cylinder, the drain valve casing directly attached thereto, the valve stem playing freely therein, and supported and guided by the valves on its ends the drain valve on one end of said stem interposed between the interior of casing and the interior of cylinder but exterior to the casing and seating against the inner end thereof, and the valve on the other end of the stem working in a closed chamber which is in continual communication with the steam space of the boiler, substantially as described.

2. The combination with the cylinder and piston therein, the drain valve casings, one secured to each end of the cylinder and each having a valve seat at each end, the double valves in said casing, fitted to said seats one interposed between the casing outlet and cylinder, and the other working in a closed chamber and a valve stem connected and guided by said valves with the pipes for conducting live steam to said closed chambers, whereby the inner or drain valve at the "idle" end of cylinder is automatically opened by the pressure of live steam against the outer valve connected to the drain valve, substantially as described.

3. The herein described drain valve consisting of the casing formed in two parts $B'$, $B^2$, having opposite valve seats $b$, $b'$ formed on its ends, and of different size, and intermediate drip opening, the stem D, the valve $d$ on one end of said stem but exterior to the casing engaging seat $b$, and the smaller adjustable valve E secured on the other end of the stem engaging seat $b'$, said valves forming the only guides and supports for the stem; in combination with the cylinder and the steam pipe G, all constructed and arranged to operate substantially as and for the purpose specified.

In testimony that I claim the foregoing as my own I affix my signature in presence of two witnesses.

EDWARD BERGIN.

Witnesses:
C. H. MURPHY,
J. A. HANLEY.